Aug. 6, 1957 C. MALNATI 2,801,727
CONVEYOR OF TRANSVERSELY VARYING WIDTH
Filed Dec. 30, 1952 2 Sheets-Sheet 1
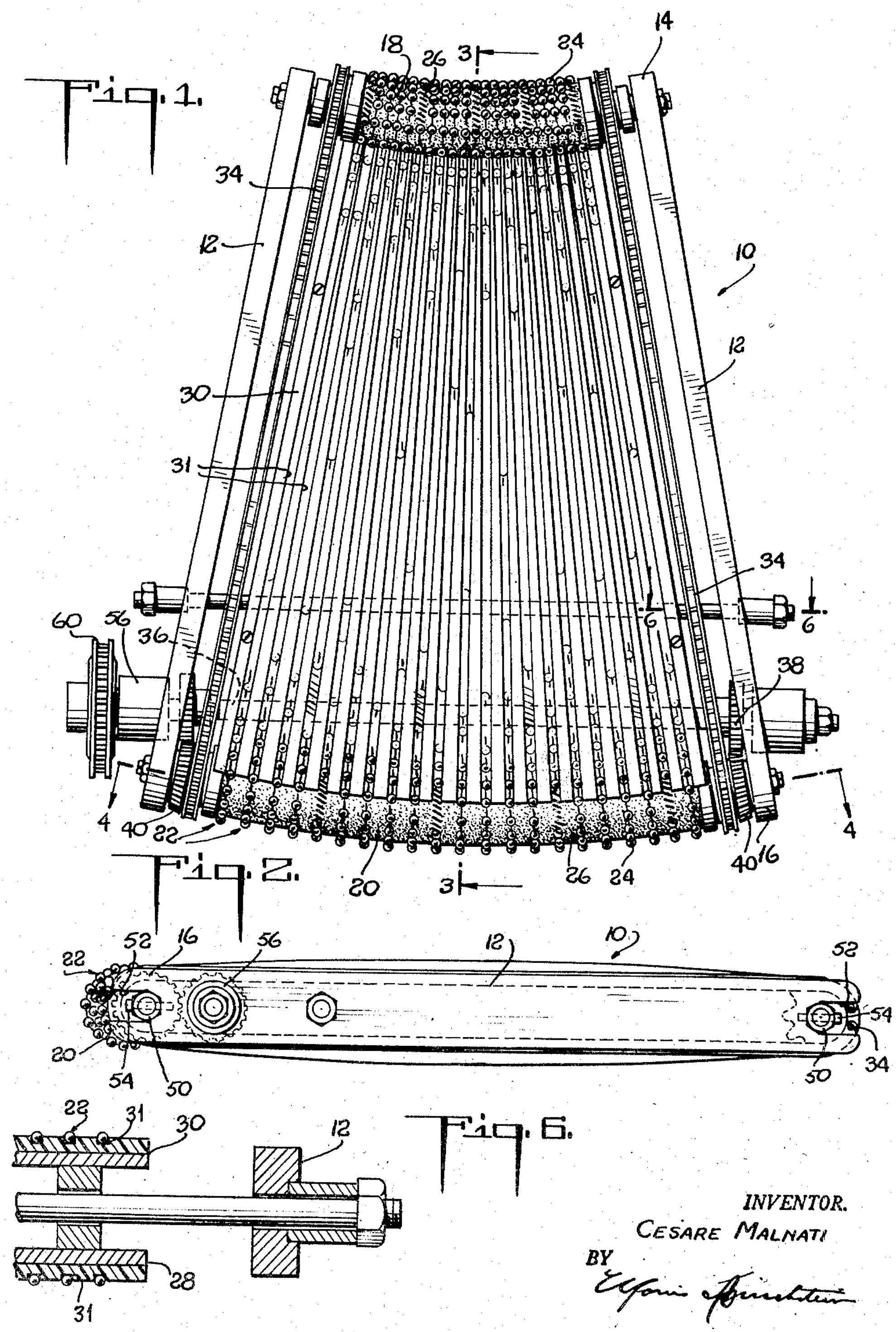
INVENTOR.
CESARE MALNATI
BY
ATTORNEY Aug. 6, 1957 C. MALNATI 2,801,727
CONVEYOR OF TRANSVERSELY VARYING WIDTH
Filed Dec. 30, 1952 2 Sheets-Sheet 2
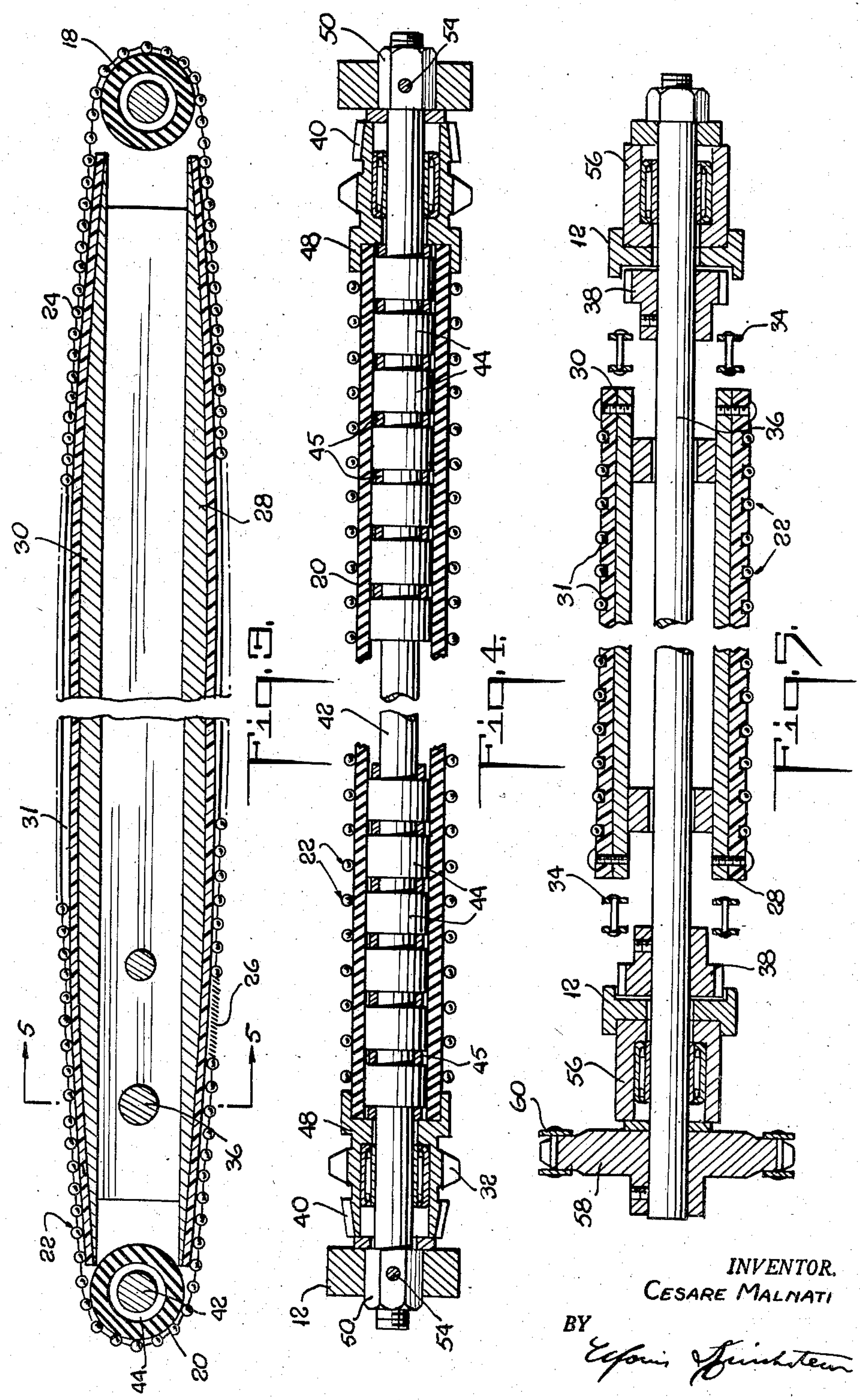
INVENTOR.
CESARE MALNATI
BY
ATTORNEY United States Patent Office 2,801,727
Patented Aug. 6, 1957

2,801,727

CONVEYOR OF TRANSVERSELY VARYING WIDTH

Cesare Malnati, Copiague, N. Y.

Application December 30, 1952, Serial No. 328,685

8 Claims. (Cl. 198—34)

This invention relates to a conveyor of transversely varying width.

More specifically, the invention relates to a conveyor which is particularly useful for separating unbaked strips of bread stick dough as, for example, in a machine such as shown and described in Letters Patent No. 2,545,667, issued March 20, 1951. The invention, however, is not to be considered as limited to such use since it may be employed for separating or bringing together any articles or strips.

It is an object of the present invention to provide an apparatus of the character described which is simple and inexpensive to manufacture and is durable under conditions of heavy use.

It is another object of the present invention to provide an apparatus of the character described which is an improvement over that shown in said Letters Patent in that it is capable of greater expansion or contraction.

Other objects of the invention will in part be obvious and in part will be pointed out hereinafter.

The invention accordingly consists in the features of construction, combinations of elements and arrangements of parts which will be exemplified in the device hereinafter described and of which the scope of application will be indicated in the appended claims.

In the accompanying drawings in which is shown one of the various possible embodiments of the invention, Fig. 1 is a top view of a conveyor constructed in accordance with the present invention;

Fig. 2 is a side view thereof;

Figs. 3 and 4 are enlarged sectional views taken substantially along the lines 3—3 and 4—4, respectively, of Fig. 1;

Fig. 5 is an enlarged sectional view taken substantially along the line 5—5 of Fig. 3; and Fig. 6 is an enlarged fragmentary sectional view taken substantially along the line 6—6 of Fig. 1.

The invention will be described as it is used in a machine for separating strips of bread stick dough.

Pursuant to the instant invention said machine includes a special conveyor belt which as it progresses away from a zone at which dough strips are deposited has its width increased transversely of its direction of travel by moving apart side-by-side elements on which the strips are supported and translated and thereby separating the strips.

Referring now in detail to the drawings, the reference numeral 10 denotes a conveyor embodying the present invention. The conveyor includes a frame constituting a pair of side beams 12 which diverge from a narrow end 14 to a wide end 16.

A roller 18 crosses the narrow end of the frame and another roller 20 the wide end. Both rollers are surfaced with a material such as rubber which is flexible and has good traction qualities. It is a critical feature of the invention that both rollers have concentric curved longitudinal axes. The reason for this, and the structure by which it is accomplished, will be described in detail hereinafter.

A plurality of narrow endless belts 22 are trained about the rollers, and, because the rollers are concentric, the belts are of the same length and in fanwise mutual relationship. A typical belt comprises a few lengths 24 a ball chain joined by helical springs 26 which maintain the belts under tension. Said belts are guided intermediate their ends by a lower plate 28 and an upper plate 30. These plates are provided with longitudinal grooves 31 in which the belts travel, said grooves being radially disposed with respect to the common center of the concentric longitudinal axes of the rollers, i. e. they diverge from each other in the direction of the wide end.

Each roller has a sprocket 32 secured on each end, chains 34 being trained about these sprokets, i. e. a chain connects a sprocket on one side of the roller 18 with a sprocket on the same side of the larger roller 20. The larger roller is driven from a countershaft 36 by a pair of gears 38 on the shaft meshing with gears 40 on the roller.

The importance of having the longitudinal axes of the roller concentrically curved arises from an observation I have made that a narrow belt trained about a roller tends to move to a position on the roller in which it is perpendicular to the rollers' longitudinal axis, i. e. the axis about which the roller turns. In accordance with the present invention the belts are to be maintained in fanwise mutual relationship, that is to say, relatively angularly inclined. Therefore pursuant to my observation to keep the belts spaced apart on the rollers each roller has adjacent portions of the surface turning about axes of rotation which are inclined relative to one another. Moreover, the portions of the two rollers engaged by the same belt are disposed to turn about axes of rotation which are parallel to one another and such portions lie in substantially the same plane.

The foregoing arrangement can be secured by employing two straight rollers, each constituting a plurality of slender individually rotatable elements which are mounted to turn about different axes with each slender rotatable element of each roller engaging a different belt. Each element would have to turn about an axis which is tilted with respect to the axis of the immediately adjacent element and each element would have to be in substantially the same plane as the element about which the same belt is trained on the other roller.

I have found it more convenient to secure the desired relative orientation of adjacent portions of the roller by employing a structure such as described hereinabove, i. e. by employing rollers having their longitudinal axes concentrically curved.

It may be observed that the aforementioned tendency of a narrow endless belt to seek a position on a roller in which the belt is perpendicular to the longitudinal axis of said roller makes it difficult to restrain the belt so that unless the grooves 31 are made quite deep the belt tends to jump out. Deep grooves would be of no assistance in this connection inasmuch as considerable friction would be generated and if the grooves are too deep the belts will not serve for transport.

To obtain a roller with a longitudinally curved axis, I provided a fixed (non-rotatable) center shaft 42 which formed to the desired curvature of the longitudinal axis of the roller. A plurality of needle bearings 44 separated by spacers 45 are slipped on the shaft so that in effect the needle bearings are arranged end-to-end. It is not necessary that the inner races of the needle bearings be tight on the shaft. It will suffice if the inner races do not wobble although it is preferred that these races fit the shaft snugly so that there will be a frictional restraint against their rotation relative to the shaft. Each needle bearing is associated with a successively different portion of the curved center shaft so that each needle bearing is at a slight angle with respect to the adjacent bearings.

A rubber sleeve is slipped over the bearings and is in frictional contact with the external surfaces of the outer races of the needle bearings so that the sleeve turns with the bearings. Thus successive portions of the sleeve turn about axes of rotation which are differently angularly inclined. In overall effect, accordingly, the sleeve turns as a whole about a curved axis of rotation which is coincident with the longitudinal axis of the center shaft.

Caps 48 are secured to the ends of the sleeves, the sprockets and gears being fast to the caps. To hold the shafts 42 in place their ends are threaded to receive hex nuts 50 which are disposed in slots 52 at the ends of the beams 12. Locking pins 54 secure the nuts in place.

The countershaft 36 is supported and driven in any suitable fashion. For example, the shaft is journalled in bearings 56 that are fixed to the beams 12. One end of the countershaft carries a sprocket 58 that is engaged by a chain 60 actuated by a suitable source of power (not shown), as, for example, a motor.

The active elements of the conveyor, i. e. the elements which transport objects such, for instance, as strips of dough from one end to the other of the conveyor, are the plural endless narrow belts 26 which, since they are arranged in mutual fanwise relationship, will either spread objects apart as they are transported or bring them closer together, depending upon the direction of movement of the upper reaches of the belts. It therefore should be understood that said upper reaches must project above the tops of the grooves 31 to be available to support the objects being transported.

It thus will be seen that there is provided a device which achieves all the objects of the invention and is well adapted to meet the conditions of practical use.

As various possible embodiments might be made of the above invention, and as various changes might be made in the embodiment above set forth, it is to be understood that all matter herein described, or shown in the accompanying drawings, is to be interpreted as illustrative and not in a limiting sense.

Having thus described the invention, there is claimed as new and desired to be secured by Letters Patent:

1. A conveyor for shifting objects transversely of a direction in which they are translated by the conveyor, said conveyor including a pair of arcuate concentric registered rollers with resilient unitary unbroken surfaces, and a plurality of narrow endless belts trained about said rollers and in fanwise mutual relationship, adjacent portions of each of said rollers turning about axes of rotation which are relatively inclined, the portions of said rollers engaged by each belt being substantially perpendicular to the belt and in substantially the same plane as one another.

2. A conveyor for shifting objects transversely of a direction in which they are translated by the conveyor, said conveyor including a pair of arcuate concentric registered rollers with resilient unitary unbroken surfaces, a plurality of narrow endless belts trained about said rollers and in fanwise mutual relationship, adjacent portions of each of said rollers turning about axes of rotation which are relatively inclined, the portions of said rollers engaged by each belt being substantially perpendicular to the belt and in substantially the same plane as one another, and means to turn said rollers in synchronism.

3. A conveyor for shifting objects transversely of a direction in which they are translated by the conveyor, said conveyor including a pair of registered rollers with concentrically curved longitudinal axes and resilient unitary unbroken surfaces, and a plurality of narrow resilient endless belts trained about said rollers and in fanwise mutual relationship, whereby said elements diverge from the roller of lesser radius of curvature to the roller of greater radius of curvature.

4. A conveyor for shifting objects transversely of a direction in which they are translated by the conveyor, said conveyor including a first roller with a curved longitudinal axis, a second roller with a curved longitudinal axis, said second roller being longer than and registered with the first roller, the radius of curvature of the longitudinal axis of the first roller being less than the radius of curvature of the longitudinal axis of the second roller, the longitudinal axes of said rollers being concentric, each of said rollers having a resilient unitary unbroken surface, a plurality of narrow endless belts trained about said rollers and diverging from the common center about which their longitudinal axes are concentric, and means to turn said rollers in synchronism.

5. A conveyor as set forth in claim 4 wherein each roller comprises a curved fixed shaft, a plurality of short antifriction bearings each of which includes an inner race and an outer race which is rotatable with respect to the inner race, said bearings being mounted on said shaft and spaced longitudinally on the shaft from one another, each of said inner recess being fixed with respect to the shaft, and a flexible traction sleeve extending over said bearings and engaging the outer races thereof whereby the sleeve rotates as a whole with all of said outer races.

6. A conveyor for shifting objects transversely of a direction in which they are translated by the conveyor, said conveyor including a first roller with a curved longitudinal axis, a second roller with a curved longitudinal axis, said second roller being longer than and registered with the first roller, the radius of curvature of the longitudinal axis of the first roller being less than the radius of curvature of the longitudinal axis of the second roller, the longitudinal axes of said rollers being concentric, each of said rollers having a resilient unitary unbroken surface, a plurality of narrow endless belts trained about said rollers and diverging from the common center about which their longitudinal axes are concentric, and means to turn said rollers in synchronism, each of said rollers having a uniform diameter.

7. A conveyor for shifting objects transversely of a direction in which they are translated by the conveyor, said conveyor including a first roller with a curved longitudinal axis, a second roller with a curved longitudinal axis, said second roller being longer than and registered with the first roller, the radius of curvature of the longitudinal axis of the first roller being less than the radius of curvature of the longitudinal axis of the second roller, the longitudinal axes of said rollers being concentric, each of said rollers having a resilient unitary unbroken surface, a plurality of narrow endless belts trained about said rollers and diverging from the common center about which their longitudinal axes are concentric, and means to turn said rollers in synchronism, each of said rollers having the same uniform diameter.

8. A conveyor for shifting objects transversely of a direction in which they are translated by the conveyor, said conveyor including a first roller with a curved longitudinal axis, a second roller with a curved longitudinal axis, said second roller being longer than and registered with the first roller, the radius of curvature of the longitudinal axis of the first roller being less than the radius of curvature of the longitudinal axis of the second roller, the longitudinal axes of said rollers being concentric, each of said rollers having a resilient unitary unbroken surface, a plurality of narrow endless belts trained about said rollers and diverging from the common center about which their longitudinal axes are concentric, means to turn said rollers in synchronism, and a plate beneath the upper reaches of the belts, said plate having grooves radially diverging from said common center and accommodating said upper reaches.

(References on following page)

References Cited in the file of this patent

UNITED STATES PATENTS

| | | |
|---|---|---|
| 145,447 | Reigart | Dec. 9, 1873 |
| 1,208,234 | Ternstedt | Dec. 12, 1916 |
| 1,814,652 | Weiss | July 14, 1931 |
| 1,938,110 | Neutelings | Dec. 5, 1933 |
| 2,393,191 | Robertson | Jan. 15, 1946 |
| 2,562,949 | Robertson | Aug. 7, 1951 |
| 2,594,591 | Runton | Apr. 29, 1952 |
| 2,619,703 | Dungler | Dec. 2, 1952 |
| 2,626,422 | Lammertse | Jan. 27, 1953 |

FOREIGN PATENTS

| | | |
|---|---|---|
| 525,995 | Germany | June 1, 1931 |